United States Patent
Dross (10) Patent No.: US 10,794,565 B2
(45) Date of Patent: Oct. 6, 2020

(54) DIELECTRIC COLLIMATOR WITH A REJECTING CENTER LENS

(71) Applicant: SIGNIFY HOLDING B.V., Eindhoven (NL)

(72) Inventor: Oliver Dross, Waalre (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 16/482,449

(22) PCT Filed: Feb. 1, 2018

(86) PCT No.: PCT/EP2018/052515
§ 371 (c)(1),
(2) Date: Jul. 31, 2019

(87) PCT Pub. No.: WO2018/141846
PCT Pub. Date: Aug. 9, 2018

(65) Prior Publication Data
US 2020/0041097 A1    Feb. 6, 2020

(30) Foreign Application Priority Data
Feb. 2, 2017    (EP) .................................... 17154379

(51) Int. Cl.
| F21V 21/00 | (2006.01) |
| F21V 5/00 | (2018.01) |
| F21V 5/04 | (2006.01) |
| F21V 7/00 | (2006.01) |
| G02B 19/00 | (2006.01) |

(52) U.S. Cl.
CPC .............. *F21V 5/006* (2013.01); *F21V 5/045* (2013.01); *F21V 7/0091* (2013.01); *G02B 19/0028* (2013.01); *G02B 19/0061* (2013.01)

(58) Field of Classification Search
CPC ........ F21V 5/006; F21V 5/045; F21V 7/0091; F21V 5/046; G02B 19/0028
USPC ............................ 362/311.06, 311.02, 296.1
See application file for complete search history.

(56) References Cited

U.S. PATENT DOCUMENTS

| 5,042,928 A | 8/1991 | Richards |
| 8,371,710 B2 | 2/2013 | Gupta et al. |
| 8,851,731 B2 * | 10/2014 | Zhang ...................... F21V 9/30 |
| | | 362/558 |

(Continued)

FOREIGN PATENT DOCUMENTS

| CN | 202266986 U | 6/2012 |
| EP | 1617247 A2 | 1/2006 |
| WO | 2015185519 A1 | 12/2015 |

Primary Examiner — Laura K Tso
(74) Attorney, Agent, or Firm — Daniel J. Piotrowski (57) ABSTRACT

A dielectric collimator (1) comprising a center lens (3), the center lens comprising a light input surface (31) and a light exit surface (32), the light exit surface (32) being convex and substantially hemispherical, and the light input surface (31) comprising a central surface section (312) forming a light transmitting portion of the center lens adapted for receiving incoming light (5) and transmitting it to be emitted from the light exit surface, and a peripherally extending, annular outer surface section (311) being substantially plane and adapted for redirecting incoming light (5) in such a manner that the redirected light (7) undergoes TIR at the light exit surface and is emitted back out of the light input surface.

15 Claims, 4 Drawing Sheets

(56) References Cited

U.S. PATENT DOCUMENTS

| | | |
|---|---|---|
| 2010/0039830 A1 | 2/2010 | Cheung et al. |
| 2011/0157898 A1* | 6/2011 | Kanai ........................ F21V 5/04 |
| | | 362/296.05 |
| 2016/0010829 A1 | 1/2016 | Gielen et al. |
| 2016/0040832 A1* | 2/2016 | Sakagami ................. F21K 9/20 |
| | | 362/311.02 |
| 2016/0053964 A1* | 2/2016 | Hu ..................... G02B 19/0071 |
| | | 362/311.02 |
| 2016/0161062 A1* | 6/2016 | Bergmann ................ F21K 9/23 |
| | | 362/297 |

* cited by examiner

DIELECTRIC COLLIMATOR WITH A REJECTING CENTER LENS

FIELD OF THE INVENTION

The invention concerns a dielectric collimator comprising a center lens, the center lens comprising a light input surface and a light exit surface.

BACKGROUND OF THE INVENTION

Dielectric collimators, and in particular TIR collimators, are the workhorses of LED lighting. Many variants are used and literally billions produced every year. TIR collimators have two sections, a section working by total internal reflection (TIR), also known as a TIR section, and a center section that is basically a lens focusing light by two refractions. In a typical design 30 to 40% of the light travels through the center lens and the rest of the light through the TIR section.

For example, U.S. Pat. No. 8,371,710 B2 describes a lens for a flashlight, the lens albeit being adapted for focusing light essentially having the structure of the above-mentioned prior art types of TIR collimators. The lens comprises a lens body with a front face, a rear void, and a side surface that extends between front face and rear well. The front face includes a central surface forming a light exit surface of a central portion of the lens and an annular surface forming a light exit surface of an outer annular portion of the lens corresponding to a TIR section as described above. The rear void comprises a void sidewall and a base, the latter defining a light input surface of the center portion. A light source is arranged such as to be displaceable along an optical axis into and out of the rear void.

The achievable on-axis intensity from a TIR collimator is dominated by the TIR path which contributes approximately 80%, where the center lens only contributes 20%. This follows from the fact that intensity is proportional to the source luminance times the area emitting along the axis. The center lens covers only a small center part of the lens and therefore has a small surface area and hence contributes little to intensity. There are other substantial differences between the two light paths. The TIR path is a non-imaging path and it produces a relatively narrow light distribution, due to the rules of etendue and the ray assignation. The center lens, however, is imaging the source into the far field, if no diffusion features are used. This is in general not wanted because a clear source image makes any non-uniform feature of the LED visible on a target surface, such as bond wires, sharp edges, color differences and the like.

Due to the proximity of the lens to the source, the source image produced by the lens is rather wide which causes it to dominate the fringe of the light distribution of the full TIR collimator. Such light is in many cases unwanted, because it creates a halo around the main beam. When looking back into a spot lamp, from a certain angular range only the center lenses of each TIR collimator emit light, which is perceived as glare and spottiness. This can be observed in many, if not most of today's LED spot lamps. The center lens, especially because of its imaging characteristics, is problematic when used with chips on board (COB) light sources or mid power light sources, because the edge of such light sources emits fully converted yellowish light. The center lens puts such light at the edge of the light distribution, thus creating a yellow outermost ring around the light distribution with leads to complaints.

In other words, there is too much etendue in the center lens section. Making the beam angle smaller while maintaining the size of the lens is only possible by reducing the etendue, which means reducing the amount of flux transmitted through the lens. This can be done by using a mask to absorb or reflect part of the light. However, besides the reduction of efficiency of the lens, the introduction of an absorbing element means an extra step in production, in the form of an injection molded part of a second material, an inserted part or some kind of a printing or painting process. This added cost is not desirable.

SUMMARY OF THE INVENTION

It is an object of the present invention to overcome this problem, and to provide a dielectric collimator which in use exhibits a reduced etendue and thereby reducing or even completely removing the halo effect caused by the proximity of the lens to the source.

According to a first aspect of the invention, this and other objectives are achieved by means of a dielectric collimator comprising a center lens, the center lens comprising a light input surface and a light exit surface, the light exit surface being convex and substantially hemispherical, and the light input surface comprises a central surface section forming a light transmitting portion of the center lens adapted for receiving incoming light and transmitting it to be emitted from the light exit surface, and a peripherally extending, annular outer surface section being substantially plane and adapted for redirecting incoming light in such a manner that the redirected light undergoes TIR at the light exit surface and is emitted back out of the light input surface. By providing a dielectric collimator with a center lens comprising a light exit surface being convex and substantially hemispherical, and a light input surface comprising a peripherally extending, annular outer surface section being substantially plane and adapted for redirecting incoming light in such a manner that the redirected light undergoes TIR at the light exit surface, a dielectric collimator is provided with a center lens reshaped such as to enable rejection of a part of the incoming light, rather than absorbing it. The rejection is achieved by total internal reflection of light received at the annular outer surface section at the light input surface at the hemispherical light exit surface. The principle behind this construction may be seen as shaping the light exit surface of the lens in such a way that an outer section of the lens along the light exit surface essentially works as a circular light guide that turns incident light by 180 degrees. The reflection mode thus obtained is comparable to a so-called whispering gallery mode known from both acoustics and optics.

In this connection it is noted that when describing the light exit surface as being "substantially hemispherical" it is by using the word substantially intended to encompass smaller deviations from a perfectly hemispherical shape, since minor deviations from a perfectly hemispherical shape is in fact possible and acceptable without compromising the achieved result. Also, it is noted that when describing the annular outer surface section as being "substantially flat" it is by using the word substantially intended to encompass smaller deviations from a perfectly flat shape, such as for example a surface roughness and surface structures.

Thus, a dielectric collimator is provided which in use exhibits a reduced etendue and with which the halo effect caused by the proximity of the lens to the source is reduced considerably or even completely removed. Furthermore, no additional absorbing or reflecting elements or materials are employed.

By further providing the center lens with a light input surface comprising a central surface section forming a light transmitting portion, the above advantages are obtained while also providing the center lens with a transmitting portion such as to ensure a light output with a sufficiently narrow beam angle.

In an embodiment the light input surface of the center lens comprises a center C and the outer surface section extends over a part of the light input surface extending in a radial distance from the center C in the interval from 1/n*r to r, where n is the refractive index of the material of the center lens and r is the radius of the substantially hemispherical light exit surface.

In an embodiment the outer surface section of the light input surface extends over the radially outermost third of the light input surface.

By any of these two embodiments, the relation between the size of the central surface section of the center lens and the size of the annular outer surface section of the center lens, respectively, is optimized as the annular outer surface section is restricted to be provided only in the radial area of the light input surface where incident light will be refracted in such an angle that it will actually undergo TIR at the hemispherical light exit surface.

The refractive index, n, of the material of the center lens may be comprised in the interval from 1.4 to 1.6, such as for example approximately 1.5.

The rejection by multiple reflections only works in a certain radial range of a hemisphere, depending on the refractive index of the material used. The radial range of incidence in which light is rejected is approximately from 1/n*r to r, where r is the radius of the hemisphere, so for typical dielectric materials with an index of refraction of around 1.5 the outer third of the sphere radial aperture. The same mechanism works for out of plane rays as well as the shown for in-plane situations. This means a hemispherical lens can be used to reject part of the incoming light and thus reduce the etendue of transmitted light. For the light that is not reflected the hemisphere naturally provides some collimation but is straight forward to design the inner ⅔rd of the lens entry surface to improve this collimation.

The resulting center lens thus has a dual function: it partially serves as TIR reflecting device and partial as a normal refracting lens.

The outer TIR section is identical in both cases. In the modified center lens the exit surface is a hemisphere and the entry surface a flat section, covering the outermost third of the surface, that rejects incoming light, and a concave section (spherical or aspheric) that forms the transmitting portion of the lens. The two functional areas can be separated by a kink in the lens entry surface to improve collimation. A continues surface may be used, too, though, with slightly worse collimation.

It can be seen that the rays going through the collected radial range of the input surface, expand to cover a larger radial range before hitting the exit surface, where they are collimated. This expansion makes the resulting beam narrower due to etendue conservation.

In an embodiment the outer surface section of the light input surface extends perpendicular to an optical axis of the dielectric collimator or extends in an angle of less than 10° with an optical axis of the dielectric collimator.

Thereby a dielectric collimator is provided with which the light incident on the outer surface section of the light input surface is refracted in such an angle that the rejection effect along the inner side of the light exit surface is optimized.

In an embodiment the central surface section of the light input surface is concave.

Thereby a dielectric collimator is provided with which light incident on the central surface section is provided with an improved degree of collimation.

In an embodiment the central surface section of the light input surface is any one of spherical and aspheric.

Thereby a dielectric collimator is provided with which light incident on the central surface section is provided with a particularly high degree of collimation.

In an embodiment a kink is provided at the transition between the central surface section and the outer surface section of the light input surface.

In a particular embodiment the kink provided at the transition between the central surface section and the outer surface section is a convex kink.

In either case, the provision of such a kink has the result of achieving a further improvement in the degree of collimation of the incident light. A convex kink has been shown to provide the best result.

In an embodiment the transition between the central surface section and the outer surface section of the light input surface is continuous.

This provides for a light input surface of the central lens having a shape which is particularly simple to manufacture.

In an embodiment at least one of the light input surface and the light exit surface of the center lens comprises a surface texture and/or a light diffusing structure.

Thereby additional and/or improved mixing of the incoming light is achieved such as to provide a more uniform light output with a considerably improved beam quality.

In an embodiment the dielectric collimator further comprises a TIR collimating outer section extending around and connected to the center lens.

In an embodiment the TIR collimating outer section comprises a light input surface, and the light input surface of the center lens is arranged recessed with respect to the light input surface of the TIR collimating outer section.

In an embodiment the dielectric collimator further comprises a TIR collimating outer section extending around and connected to the center lens, and a portion of the convex and substantially hemispherical light exit surface of the center lens nearest the light input surface has been removed such as to allow mechanical connection to the TIR collimating outer section. In particular, a portion of the convex and substantially hemispherical light exit surface nearest the light input surface and having a 0 degree draft angle is removed.

Thereby, a dielectric collimator being particularly simple to manufacture and assemble has been provided while only effecting the efficiency of the center lens minimally.

In an embodiment the dielectric collimator is a TIR collimator, a TIR Fresnel lens or a refractive Fresnel lens.

In a second aspect the above and other objects of the invention are achieved by means of a light emitting device comprising at least one light source adapted for, in operation, emitting light, and a dielectric collimator according to any one of the preceding claims arranged to receive light emitted by the at least one light source at the light input surface, transmit a part of the light received at the central surface section of the light input surface and redirect and reject a part of the light received at the outer surface section of the light input surface.

In an embodiment the light emitting device further comprises a housing and/or a substrate on which the at least one light source is arranged, the housing and/or substrate being arranged and adapted for allowing a part of the light redirected by the peripherally extending outer plane surface section of the center lens of the dielectric collimator to be reflected back into the dielectric collimator.

Thereby a light emitting device is provided with which light losses due to the redirection of light may be lowered or minimized.

The invention further concerns such a light emitting device provided in the form of a lamp, a luminaire, a spot lamp or a spot.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
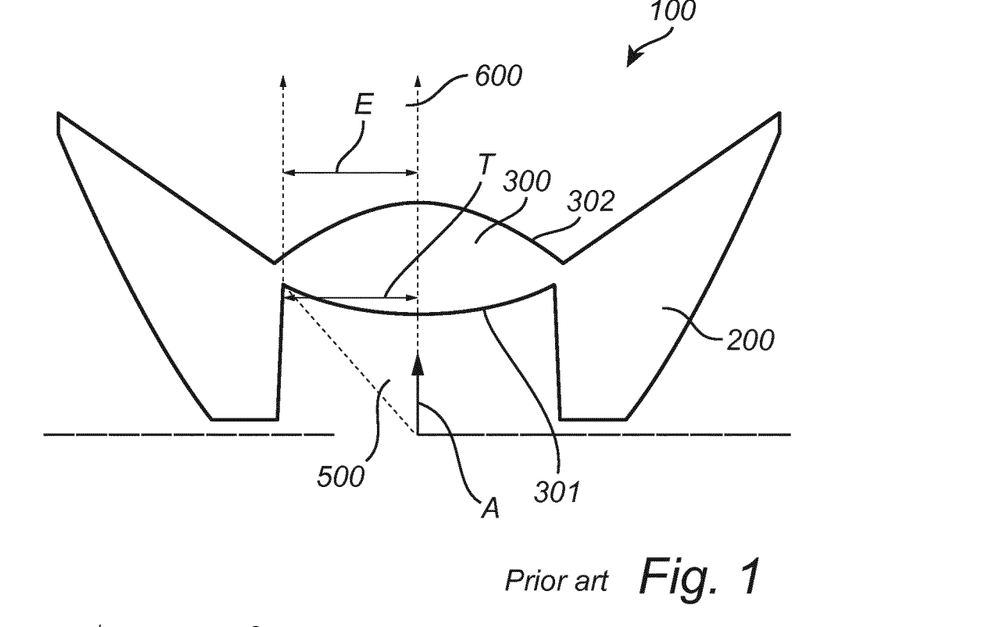
FIG. 1 shows a cross sectional side view of a prior art TIR collimator.

For the sake of reference, FIG. 1 shows a cross sectional side view of a prior art TIR collimator 100. The TIR collimator 100 comprises a center lens 300 and a TIR collimating outer section 200. The center lens 300 comprises a light input surface 301 and a light exit surface 302. The light exit surface 302 is convex curvature, which is typical for prior art types of TIR collimators. It is noted that spherical and aspheric light exit surfaces are possible and common, too. The light input surface 301 is also convex, and the whole radial surface area of the light input surface is used for collecting and transmitting incident light, thus forming a radial transmission range, T, encompassing the whole light input surface 301. Likewise, the whole radial surface area of the light exit surface 302 is used for emitting transmitted and collimated incident light, thus forming a radial emission range, E, encompassing the whole light exit surface 302. The beam path of incident light 500 travelling through the TIR collimator 100 and eventually being emitted as collimated light 600 is shown in FIG. 1.

Figure 2:
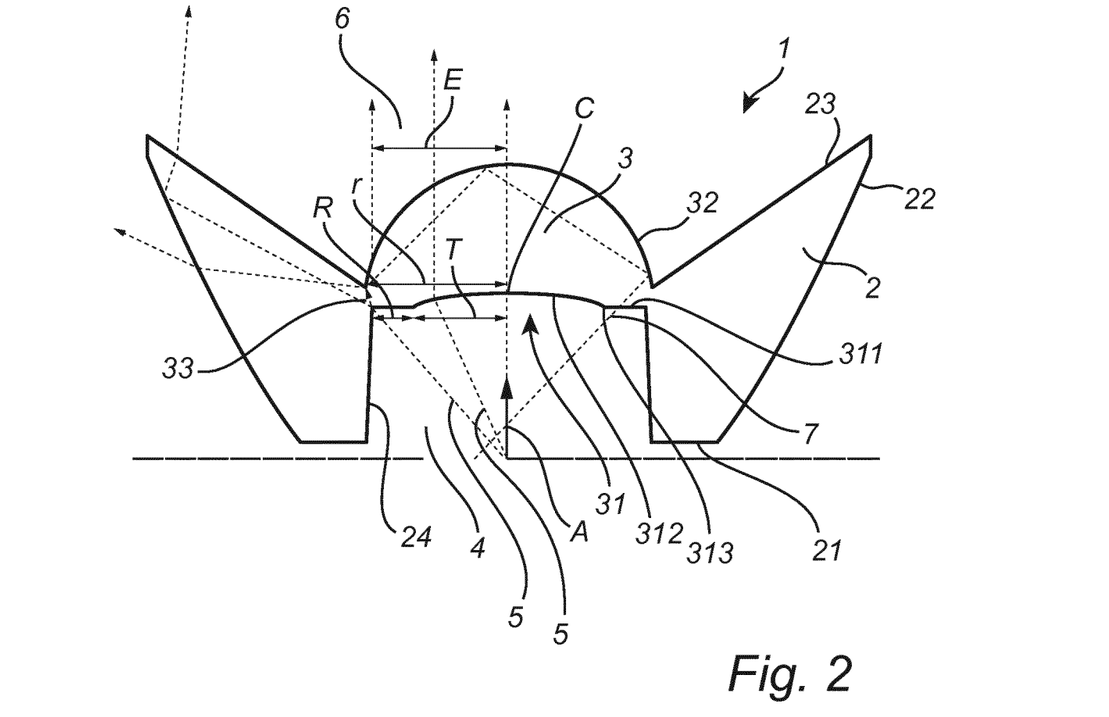
FIG. 2 shows a cross sectional side view of a dielectric collimator according to the first aspect of the invention.
Figure 3:
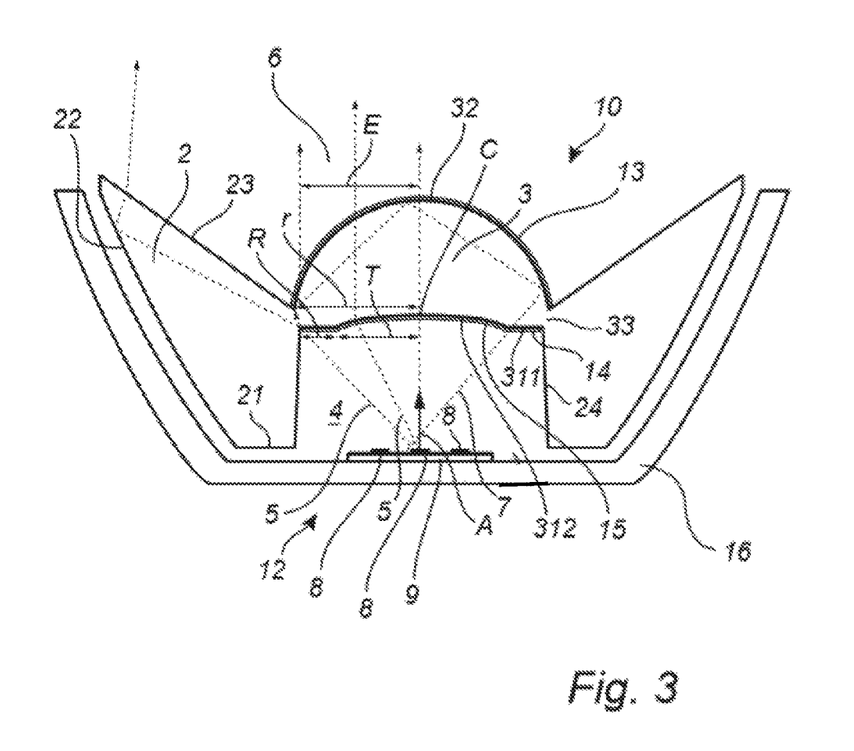
FIG. 3 shows a cross sectional side view of a light emitting device according to the second aspect of the invention and comprising a dielectric collimator according to the first aspect of the invention.

Turning now to FIGS. 2 and 3, various features of a dielectric collimator 1 and a light emitting device 12 according to the invention will be described.

FIG. 2 shows a cross sectional side view of a dielectric collimator 1 according to the invention. The dielectric collimator 1 comprises a center lens 3. The center lens 3 comprises a light input surface 31 and a light exit surface 32. The center lens 3 is made of a transparent material, such as a suitable type of glass or polymer, comprising a refractive index, n.

The light exit surface 32 is convex and substantially hemispherical. In other words, the precise shape of the light exit surface 32 need not be perfectly spherical. Rather, the shape of the light exit surface 32 may deviate slightly from being spherical, although the combination of a spherical central portion and a macrofocal parabolic portion at the rim is considered the ideal shape. Providing a macrofocal parabolic portion at the rim provides for ideal reflection behavior at the exit surface. The concept of macrofocal profiles is known per se and is described in Julio Chaves: Non imaging Optics, $2^{nd}$ edition, CRC Press, cf. page 87. The hemispherical light exit surface 32 comprises a radius, r.

The light input surface 31 comprises a central surface section 312. The central surface section 312 forms a light transmitting portion or a radial light transmitting range, T, of the center lens 3. The central surface section 312 of the light input surface 31 is concave and may be spherical or aspheric. In alternative embodiments the central surface section 312 of the light input surface 31 may be flat or even convex.

The light input surface 31 further comprises an annular outer surface section 311. The outer surface section 311 extends peripherally around the central surface section 312. The outer surface section 311 is plane and is adapted for redirecting incoming light in such a manner that the redirected light undergoes several total internal reflections at the light exit surface 32 of the center lens. The outer surface section 311 thus forms a radial redirecting range, R. The annular outer surface section 311 extends perpendicular to an optical axis illustrated by arrow A of the dielectric collimator 1. Alternatively, the annular outer surface section 311 may extend in an angle of less than 10° with the optical axis A of the dielectric collimator 1.

The light input surface 31 of the center lens 3 further comprises a center C. The outer surface section 311 extends over a part of the light input surface 31 extending in a distance from the center C defined by the interval from 1/n*r to r.

For example, if the center lens 3 is made of a material with a refractive index, n, of approximately 1.5, the outer surface section 311 of the light input surface 31 extends over the radially outermost third of the light input surface. Indeed, this may also be the case for refractive indices, n, of the material of the center lens comprised in the interval from 1.4 to 1.6.

The beam path of incident light 5 emitted by a light source (cf. FIG. 3), travelling through the dielectric collimator 1 and eventually being emitted as either collimated light 6 or redirected light 7 is shown in FIG. 2. As may be seen the part of the incident light 5 entering the dielectric collimator 1 through the outer annular section 311 of the light input surface 31 is lead through the dielectric collimator 1 along the inside of the light exit surface 32 and eventually emitted as redirected light 7 in a direction back towards the light source. The part of the incident light 5 entering the dielectric collimator 1 through the central section 312 of the light input surface 31 is lead through the dielectric collimator 1, is collimated on the way and is eventually emitted as collimated light 6 from the light exit surface 32.

An optional kink 313 or step is provided at the transition between the central surface section 312 and the outer surface section 311 of the light input surface 31. The kink 313 may for instance be convex or discontinuous. Alternatively, the transition between the central surface section 312 and the outer surface section 311 of the light input surface 31 may be continuous. A combination of circumferential sections of the transition being provided with a kink and other circumferential sections of the transition being continuous may also be envisaged.

The dielectric collimator 1 further comprises an optional TIR collimating outer section 2. The TIR collimating outer section 2 comprises, in a manner known per se, a rim or light input surface 24, a light exit surface 23 and an outer circumferentially extending wall 22. Light entering the TIR collimating outer section 2 through the light input surface 24 will undergo TIR at the outer circumferentially extending wall 22 and be emitted through the light exit surface 23 or through the center lens 3.

The TIR collimating outer section 2 extends around the center lens 3 along the periphery of the center lens. The TIR collimating outer section 2 is connected to the center lens 3 at a transition 33. To allow connection of the center lens 3 and the TIR collimating outer section 2, a portion of the convex and substantially hemispherical light exit surface 32 of the center lens 3 nearest the light input surface 31 may be removed.

The TIR collimating outer section 2 has also, in a manner likewise known per se, comprises a recess or void 4 with a circumferentially extending wall 24. In such embodiments, the surface 31 of the center lens 3 may be arranged recessed with respect to the bottom surface 21 or rim of the TIR collimating outer section 2. The circumferentially extending wall 24 is the light input surface for the TIR section. Light entering the TIR collimator outer section 2 through the circumferentially extending wall 24 will thus undergo TIR at the outer circumferentially extending wall 22 and be emitted through the light exit surface 23 or through the center lens 3.

FIG. 3 shows a cross sectional side view of a light emitting device 12 according to the second aspect of the invention. The light emitting device comprises at least one light source 8 adapted for, in operation, emitting light and a dielectric collimator 10 according to the invention.

The dielectric collimator 10 is identical to the dielectric collimator 1 described above with reference to FIG. 2, but with one exception. Namely, the dielectric collimator 10 comprises a surface texture and/or a light diffusing structure 13 arranged on the light exit surface 32 of the center lens 3, a surface texture and/or a light diffusing structure 14 arranged on the annular outer portion 311 of the light input surface 31 and a surface texture and/or a light diffusing structure 15 arranged on the central portion 312 of the light input surface 31. It is noted that the surface textures and/or light diffusing structures 13, 14 and 15 may be identical, different or mutually different. Also, in alternative embodiments it is feasible to provide only one or two of the surface textures and/or light diffusing structures 13, 14 and 15. Suitable surface textures include, but is not limited to, microlenses. In fact, in a preferred embodiment a surface texture and/or a light diffusing structure 15 arranged on the central portion 312 of the light input surface 31, while annular outer section 311 of the light input surface 31 and the light exit surface 32 comprises no such structures.

The dielectric collimator 1 is arranged to receive light 5 emitted by the at least one light source 8. The one or more light sources 8 may in principle be any suitable type of light source, although LEDs are preferred. Possible exemplary types of light sources are Lambertian light sources, Lambertian disk light sources, low power light sources, mid power light sources and high power light sources.

The light emitting device 12 further comprises an optional housing 16 and a likewise optional substrate 9, such as a printed circuit board, on which the at least one light source 8 is arranged. The housing 16 and/or the substrate 9 may be arranged and adapted for allowing a part of the light 7 redirected by the peripherally extending outer plane surface section 311 of the center lens 3 of the dielectric collimator 1 and emitted back out of the light input surface 31 to be reflected back into the dielectric collimator 1. To this end the housing 16 and/or the substrate 9 may be made of a reflective material or comprise a reflective layer or coating. Also, even the light sources 8 themselves may comprise a reflective layer or coating such as to be adapted for allowing a part of the light 7 redirected by the peripherally extending outer plane surface section 311 of the center lens 3 of the dielectric collimator 1 and emitted back out of the light input surface 31 to be reflected back into the dielectric collimator 1. The housing and substrate can alternatively be black to absorb all redirected light to avoid uncontrolled light.

Figure 4:
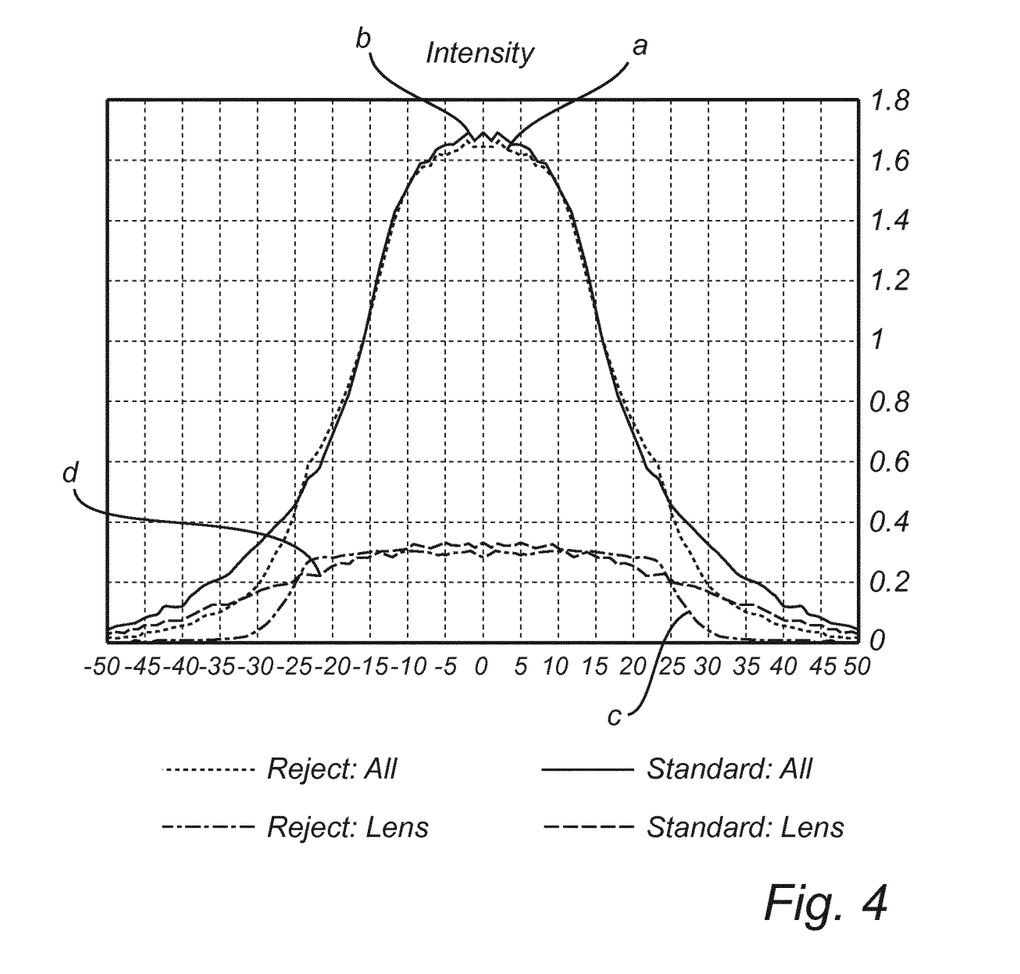
FIG. 4 shows a graph illustrating intensity distributions obtained with a Lambertian disk light source for the collimators of FIG. 1 and FIG. 2, respectively, with full light distributions and light emitted by the center lens only, respectively.
Figure 5:
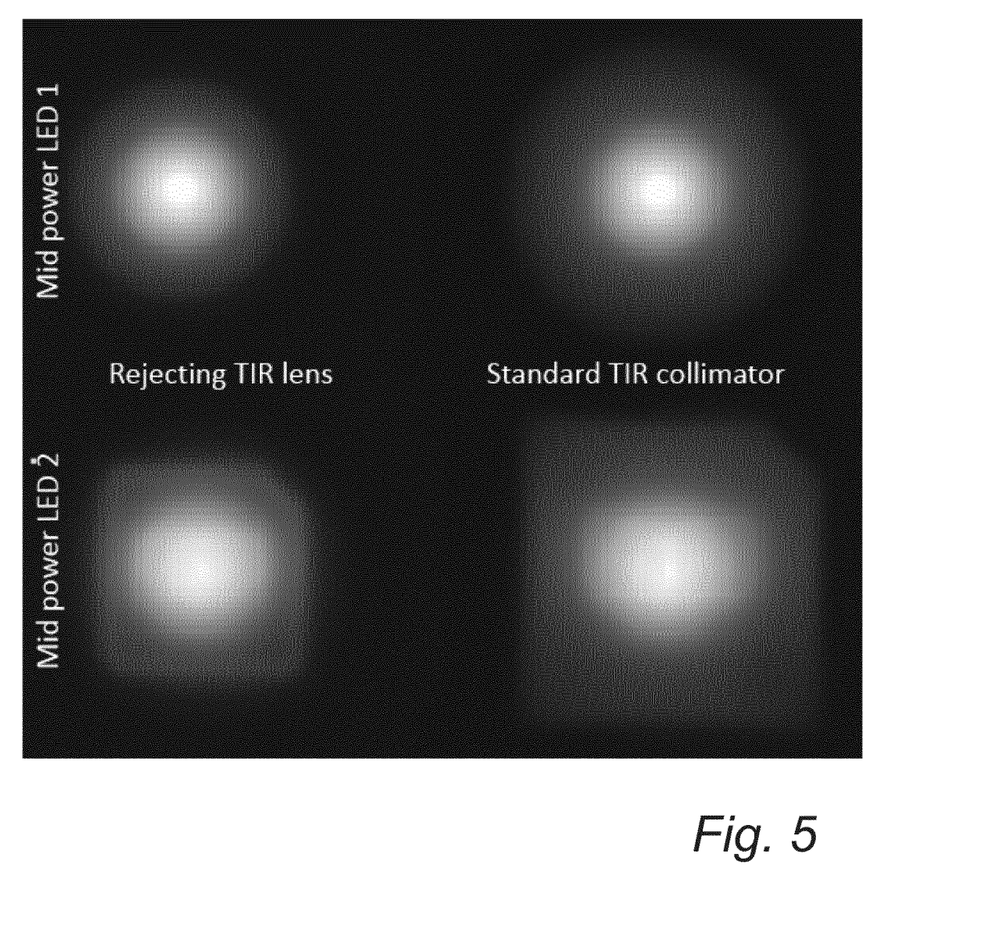
FIG. 5 shows a plot illustrating four ray trace results obtained with mid-power LED light sources. The left hand side of the plot shows the result for a collimator according to the invention and FIG. 2, while the right hand side of the plot shows the result for a prior art collimator according to FIG. 1.

Turning now to FIGS. 4 and 5 the effect of the dielectric collimator 1 according to the invention and described above will be illustrated by comparison with the prior art TIR collimator according to FIG. 1.

FIG. 4 shows a graph illustrating intensity distributions obtained with light emitted by a Lambertian disk light source for the collimators 100 and 1 of FIG. 1 and FIG. 2, respectively. Intensity distributions obtained with full light distributions and with light emitted by the center lens only, respectively, is shown for both cases.

The graph denoted a) illustrates the full light distribution for a dielectric collimator 1 according to the invention. The graph denoted b) illustrates the full light distribution for a prior art TIR collimator 100 according to FIG. 1. The graph denoted c) illustrates the light distribution through the center lens 3 only for a dielectric collimator 1 according to the invention. The graph denoted d) illustrates the light distribution through the center lens 300 only for a prior art TIR collimator 100 according to FIG. 1.

It can be seen that the light distribution of the center lens 3 of the rejecting dielectric collimator 1 according to the invention is much narrower than for the center lens 300 of the prior art TIR collimator 100. It can also be seen that the resulting full light distribution of the of the rejecting dielectric collimator 1 according to the invention has much lower intensity tails compared with the full light distribution of the prior art TIR collimator 100.

FIG. 5 shows a plot illustrating four far field intensity ray trace results obtained with mid-power LED light sources. The two ray traces on the left hand side of the plot shows the result for a collimator 1 according to the invention and FIG. 2. The two ray traces on the right hand side of the plot shows the result for a prior art collimator 100 according to FIG. 1.

It is clear from FIG. 5 that the ray traces of the dielectric collimator 1 according to the invention are clearly narrower and somewhat better mixed in comparison with the ray traces of the prior art TIR collimator 100. As regards the mixing, further improvement may be obtained by providing an additional texturing or diffusion of the center lens as described above with reference to FIG. 3, which will lead to a much better beam quality. It may also be seen from the ray traces that the beam angle is not affected by the center lens 3 as modified according to the invention, nor is the center beam intensity.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A dielectric collimator comprising a center lens, the center lens comprising a light input surface and a light exit surface,
   the light exit surface being convex and substantially hemispherical, and
   the light input surface comprising a central surface section forming a light transmitting portion of the center lens adapted for receiving incoming light and transmitting it to be emitted from the light exit surface, whereby the center lens serves as a normal refracting lens, and a peripherally extending, annular outer surface section being plane and adapted for redirecting incoming light in such a manner that the redirected light undergoes TIR at the light exit surface, whereby the center lens serves as a TIR reflecting lens, and is emitted back out of the light input surface.

2. A dielectric collimator according to claim 1, wherein the light input surface of the center lens comprises a center C and wherein the outer surface section extends over a part of the light input surface extending in a distance from the center C in the interval from (1/n)*r to r, where n is the refractive index of the material of the center lens and r is the radius of the substantially hemispherical light exit surface.

3. A dielectric collimator according to claim 1, wherein the outer surface section of the light input surface extends over the radially outermost third of the light input surface.

4. A dielectric collimator according to claim 1, wherein the outer surface section of the light input surface extends perpendicular to an optical axis (A) of the dielectric collimator or extends in an angle of less than 10° with an optical axis (A) of the dielectric collimator.

5. A dielectric collimator according to claim 1, wherein the central surface section of the light input surface is concave.

6. A dielectric collimator according to claim 1, wherein the central surface section of the light input surface is any one of spherical and aspheric.

7. A dielectric collimator according to claim 1, wherein a kink is provided at the transition between the central surface section and the outer surface section of the light input surface.

8. A dielectric collimator according to claim 1, wherein the transition between the central surface section and the outer surface section of the light input surface is continuous.

9. A dielectric collimator according to claim 1, wherein at least one of the light input surface and the light exit surface of the center lens comprises a surface texture or a light diffusing structure.

10. A dielectric collimator according to claim 1, and further comprising a TIR collimating outer section extending around and connected to the center lens.

11. A dielectric collimator according to claim 10, wherein
    a portion of the convex and substantially hemispherical light exit surface of the center lens nearest the light input surface has been removed to provide for a mechanical connection of the center lens to the TIR collimating outer section, or wherein
    the TIR collimating outer section comprises a light input surface, and wherein the light input surface of the center lens is arranged recessed with respect to the light input surface of the TIR collimating outer section.

12. A dielectric collimator according to claim 1, wherein the dielectric collimator is a TIR collimator, a TIR Fresnel lens or a refractive Fresnel lens.

13. A light emitting device comprising:
    at least one light source adapted for, in operation, emitting light, and
    a dielectric collimator according to claim 1 arranged to receive light emitted by the at least one light source at the light input surface, transmit the part of the light received at the central surface section of the light input surface and redirect and reject the part of the light received at the outer surface section of the light input surface.

14. A light emitting device according to claim 13, and further comprising a housing and/or a substrate on which the at least one light source is arranged, the housing or substrate being arranged and adapted for allowing the part of the light redirected by the peripherally extending outer plane surface section of the center lens of the dielectric collimator to be reflected back into the dielectric collimator.

15. A light emitting device according to claim 13, wherein the light emitting device is a lamp, a luminaire, or a spot lamp.

* * * * *